Oct. 29, 1963           C. P. KELLEY           3,108,795

REMOVABLE SECTION FOR MAKING VEHICLE TIRES

Filed June 1, 1961           2 Sheets-Sheet 1

INVENTOR
CHARLES PATRICK KELLEY
BY
ATTORNEY

Oct. 29, 1963  C. P. KELLEY  3,108,795
REMOVABLE SECTION FOR MAKING VEHICLE TIRES
Filed June 1, 1961  2 Sheets-Sheet 2

INVENTOR
CHARLES PATRICK KELLEY
BY
ATTORNEY

3,108,795
REMOVABLE SECTION FOR MAKING VEHICLE TIRES
Charles Patrick Kelley, Chattanooga, Tenn., assignor to National Rubber Supply, Inc., Chattanooga, Tenn., a corporation of Tennessee
Filed June 1, 1961, Ser. No. 114,227
7 Claims. (Cl. 269—321)

This invention relates to a removable section for use in the manufacture of tires composed of radially extending resilient sections held under compression in the shape of a toroid by an internal band iron.

In the manufacture of the vehicle wheels or tires disclosed in Starr et al. Patent No. 2,901,020, issued August 25, 1959, a removable, wedge-shaped spacer section or block is inserted in the tire before it is compressed to afford space for securing together, after compression, the ends of the internal band iron which holds the tire in shape.

A disadvantage of a rigid, unitary block, as heretofore used, is that when the block is removed, it must be removed radially outwardly and must be removed whole, i.e., not disassembled nor collapsed. Since the block is unitary and has its original dimensions when removed, a maximum of friction exists between the block and the resilient sections abutting against it as it is removed, due to the heavy compression of the tire. The friction between the adjoining resilient sections and the block, when force is exerted upon the block to remove it, pulls the adjoining sections in the same direction, i.e., radially outwardly from the tire, partially withdrawing them, creating an out-of-round condition and stretching the sections unduly around the band at the point where the ends of the band are fastened together. The result is a soft place in the tire which creates friction and, in a number of cases, causes tire failure due to the friction. This is true because the partially withdrawn sections at the soft place are forced up, i.e., radially inwardly, each time they hit the ground and then move back down as the tire rolls over, creating friction and heat at this part of the tire. The heat is conducted to and concentrated in the band iron which holds the tire together, either causing the band iron to burn out or breaking one of the resilient sections and allowing it to come out of the tire. The reason why the heat is collected in the band iron, instead of being dissipated to the outside of the tire, is that the band iron is a much better conductor of heat than the rubber and fabric of the resilient sections and quickly absorbs the heat.

One object of this invention is to provide a removable section for use in the manufacture of such tires which is made of two interlocking members, which are disassembled by first removing one member radially outwardly and then removing the other member radially inwardly, after the ends of the internal band iron of the tire have been secured together.

Another object is to provide such a section which affords adequate space for fastening together securely the ends of the internal band iron.

Other objects and advantages of the invention will be apparent from the following description, taken in conjunction with the accompanying drawings, in which.

Figure 1:
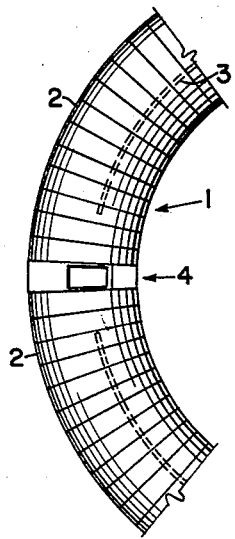
FIG. 1 is a partial side elevation of a tire toroid or annulus before it is compressed, showing a removable section in place.
Figure 2:
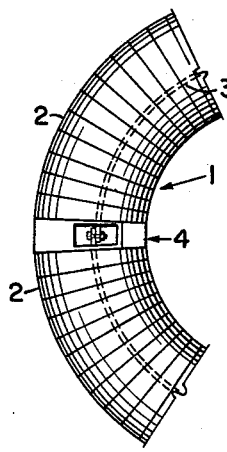
FIG. 2 is a partial side elevation of the tire toroid after it is compressed, with the removable section still in place.
Figure 3:
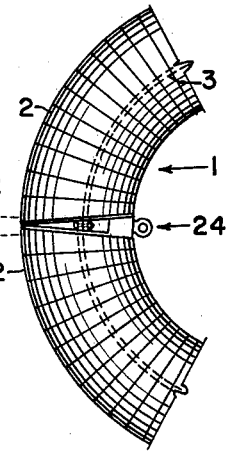
FIG. 3 is a partial side elevation similar to FIG. 2, but showing one member of the removable section pulled out of the tire and a hinged form of the other member in collapsed condition ready to be removed.

Referring now to the drawings in detail, there is shown in FIG. 1 a tire toroid or annulus 1 before compression, consisting of a large number of radially extending resilient sections 2 having slots or openings therein through which an internal band iron or tension member 3 is passed which, when its ends are secured together, holds the sections 2 together in tightly compressed condition to form a tire. A removable section, generally indicated at 4, is inserted between adjacent resilient sections 2 before compression is begun. Thereafter, the assembled tire sections are forced tightly together under high compression in a suitable manner as, for example, by means of hydraulic force. The compressed tire then has the relative size indicated in FIGS. 2 and 3. During compression, a band aligning jig, not shown, may be inserted through a lateral opening in the removable tire section 4 to stop one end of the internal band iron 3 and thus make both ends of the band iron come together at the opening. When the ends of the band iron are brought together at the opening of the section 4, a tapered pin, not shown, is then inserted through a radially extending opening in the section 4 to align the holes provided in the band iron near each of its ends. Thereafter, a box end wrench, not shown, holding a hexagonal nut, is inserted in the lateral opening in the section 4. A bolt having an Allen head is inserted radially through the radial opening in the section 4 and through the aligned openings in the ends of the band iron and screwed into the nut held by the box end wrench.

Figure 5:
FIG. 5 is a top plan view and FIG. 6 is a front elevation of one form of one member of the removable section.
Figure 4:
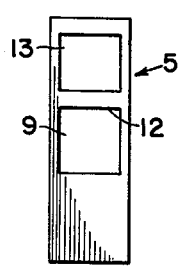
FIG. 4 is a left side elevation.
Figure 6:
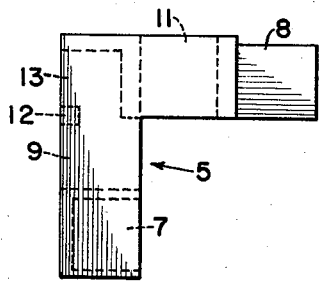
Figure 8:
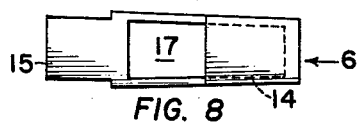
FIG. 8 is a top plan view and FIG. 9 is a front elevation of one form of the other member of the removable section.
Figure 9:
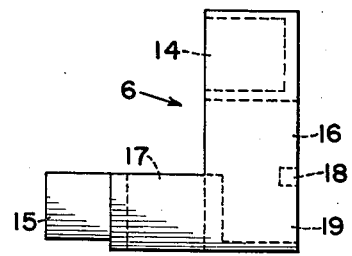
Figure 7:
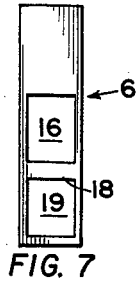
FIG. 7 is a right side elevation.
Figure 10:
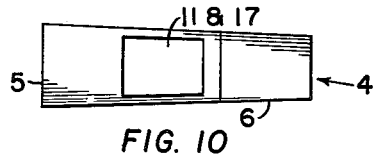
FIG. 10 is a top plan view and FIG. 11 is a front elevation of the members shown in FIGS. 4 through 9 in assembled position.

One form of removable section 4 is illustrated in FIGS. 4 through 12. It consists of two L-shaped members, generally indicated at 5 and 6, having sides which are at a slight angle to each other to form a generally wedge-shaped section, as illustrated in FIGS. 5, 8 and 10. The first member 5 has a cavity or recessed portion 7 therein and a core or plunger portion 8. Adjacent to the recessed portion 7 is a radially extending opening or aperture 9 and adjacent to the plunger portion 8 is a laterally extending opening or aperture 11. To enable removal of the member 5 from the completed tire, a ledge, rod or pin 12 is formed in the member on one side of the opening 9 and a relatively shallow hollow 13 may be formed in the member on the other side of the ledge 12 in order to facilitate placing around the ledge a hook for pulling the member 5 out of the completed tire. If desired, the hollow 13 may be omitted.

The second member 6 may be virtually identical in construction to the first member 5, including a cavity or recessed portion 14, a core or plunger 15, a radially extending opening or aperture 16 adjacent to the recessed portion 14 and a laterally extending opening or aperture 17 adjacent to the plunger 15. Likewise, a ledge, rod or pin 18 may be formed in the second member 6 to enable attachment of a hook to pull the member from the completed tire. Likewise, a shallow hollow 19 may be provided on the opposite side of the ledge, rod or pin 18 to afford easy access to the ledge for placing a hook around it.

In place of the ledges, rods or pins 12 and 18, other means of attachment of a hook may be provided, for example, eyes attached to the members and extending radially outwardly therefrom.

Figure 11:
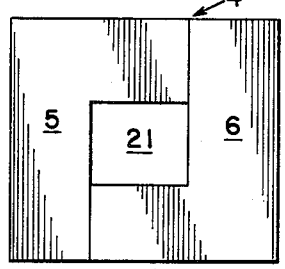
Figure 12:
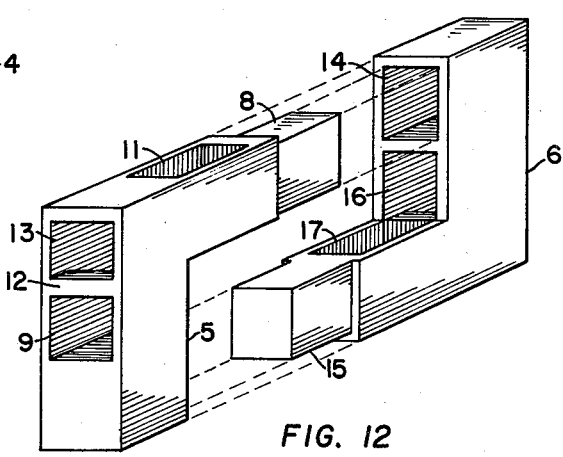
FIG. 12 is an exploded perspective view of the members shown in FIGS. 4 through 9 in positions ready to be assembled.
Figure 13:
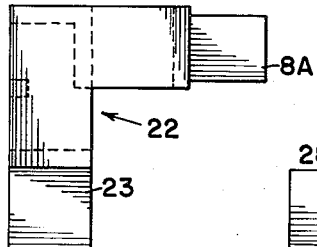
FIG. 13 is a front elevation of one member in a modified form of the invention.
Figure 14:
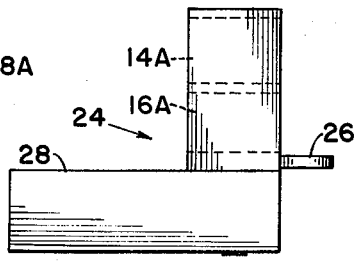
FIG. 14 is a front elevation.

In use of the section, the members 5 and 6 are interlocked and positioned between adjacent resilient sections 2, as illustrated in FIG. 1. In assembling the section, the plunger 8 on the first member 5 is inserted snugly within the recessed portion 14 of the second member 6 and the plunger 15 of the second member is inserted snugly within the recessed portion 7 of the first member 5. The parts are thus assembled, as illustrated in FIGS. 10 and 11. In the assembled position, the radially extending openings 9 and 16 are in alignment with each other and the laterally extending openings 11 and 17 are also in alignment, the latter being illustrated in FIG. 10. In addition, when assembled, the two L-shaped members 5 and 6 form a circumferentially extending opening 21 through which the internal band iron 3 of the tire passes.

As already indicated, when the section 4 comprising the assembled members 5 and 6 is inserted in the tire and compression is begun, a band aligning jig, not shown, is inserted through the lateral opening consisting of the openings 11 and 17 to stop one end of the internal band iron 3 and thus make both ends of the band iron come together at the openings as compression is continued. When the ends of the band iron are brought together at the opening, the band aligning jig is removed and a tapered pin, not shown, is inserted through the radially extending opening comprising the apertures 9 and 16 to align the holes provided in the band iron near each of its ends. Thereafter, a box end wrench, not shown, holding a hexagonal nut, is inserted in the lateral opening 11 or 17. A bolt having an Allen head is then inserted radially through either the aperture 9 or the aperture 16 and through the aligned openings in the ends of the band iron, the bolt then being screwed, by an Allen head wrench, not shown, into the nut held by the box end wrench until it is securely fastened. The box end wrench has, through its closed side, an opening sufficiently large to permit the end of the bolt to pass through it. Thereafter, if desired, the ends of the band iron may also be welded together.

After the ends of the band iron are securely fastened together, a hook is attached around the ledge, rod or pin 12 and the first member 5 is pulled radially outwardly from the completed tire. Since the first member 5 is only part of the removable section 4, pulling out of the member 5 does not permit the adjoining resilient sections 2 to be pulled radially outwardly, as they are restrained from such movement by their friction against the side walls of the second member 6. After removal of the member 5, a hook is then attached to the second member 6 and it is removed from the tire radially inwardly. Since the member 6 is pulled radially inwardly, and since it is thinner than the first member 5, there is less friction between the adjoining resilient sections 2 and the second member 6. Also, since the second member 6 is pulled radially inwardly, the adjoining sections 2 would, by their friction against the side walls of the second member 6, tend to be pulled toward each other on converging radii. The radially outward portions of their adjacent faces being already in contact with each other after removal of the first member 5, displacement of the adjoining resilient sections 2 is avoided. Even if the adjoining resilient sections 2 should be pulled inwardly to some extent, such a result would not adversely affect the tire as the resulting low place would be bridged by the other resilient sections 2 adjacent to those abutting sections and also the effect of centrifugal force in use of the tire would tend to throw the abutting resilient sections radially outwardly to their normal positions.

Figure 15:
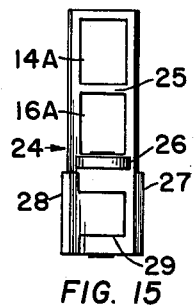
FIG. 15 is a right end elevation and FIG. 16 is a perspective view of the other member in the modified form.
Figure 16:
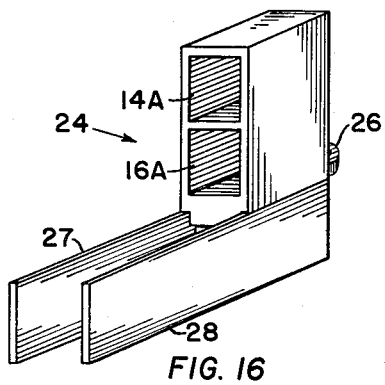

A modification of the invention is illustrated in FIGS. 13 through 16. It may comprise a first L-shaped member 22 comparable to the L-shaped member 5 in the other form of the invention already described. The first member 22 is of the same construction as the member 5, with the exception that, instead of the cavity or recess 7, which may be omitted in the member 22, a cutout or recess 23 is provided in each of the side walls of the member 22. The member 22 has a core or plunger 8A. The other member 24 in this modified form of the invention is somewhat similar to the second member 6 in the form of the invention already described, having a cavity or recessed portion 14A and, adjacent to it, a radially extending opening or aperture 16A. The recessed portion 14A may, if desired, extend entirely through the member, as shown in FIG. 15. A ledge, rod or pin 25 between the recessed portion 14A and the radially extending aperture 16A may be used for attachment of a hook to remove the member 24. Alternatively, an eye 26 may be attached to its radially inner end for attachment of a hook. The second member 24 has one radially extending plate 27 formed integrally therewith, the end of which fits snugly within one of the cutouts or recesses 23 on one side of the first member 22. A second plate 28 extends in the same general direction as the first plate 27, i.e., substantially radially, and its end is received in the other cutout or recess 23 in the first member 22. The second plate 28 is attached to the second member 24 by means of a hinge connection 29.

In use of the second form of the invention illustrated in FIGS. 13 through 16, after assembling and compression of the tire and fastening of the ends of its band iron have been completed, the first member 22 is removed from the tire in the same manner as the member 5 is removed in the other form of the invention. Upon removal of the first member 22, the hinged plate 28 is snapped, by the compression of the adjoining resilient sections 2, against the first plate 27 of the second member 24. In this way, the circumferential thickness of the second member 24 at its radially outward end is reduced by the thickness of the member 22 between its cutout or recessed portions 23. In other words, the thickness of the second member 24 is then, at its radially outward end, the sum of the thicknesses of the plates 27 and 28. Since the thickness of the second member 24 at its radially outward end is thus reduced materially, its friction with the adjoining resilient sections 2 is reduced to a minimum upon removal. Thereafter, when the second member 24 is removed radially inwardly from the completed tire by attaching a hook around either the ledge, rod or pin 25 or through the eye 26, no, or virtually no, displacement of the adjoining resilient sections 2 occurs.

Another modification of the invention is that the plate 27, as well as the plate 28, may also be attached to the second member 24 by being hinged thereto.

An advantage of this invention in any of the forms disclosed herein is that the first member 5 or 22 is removed radially outwardly while the adjoining resilient sections 2 are still held frictionally by the second member 6 or 24, so that the adjoining resilient sections are not pulled radially outwardly. Thereafter, when the second member 6 or 24 are pulled radially inwardly, the friction of the adjoining resilient sections against the second members tends to pull the adjoining resilient sections to the inside of the tire, in the direction in which the band iron holds the sections, rather than to the outside, thus producing no protruding bumpy or soft place on the outer periphery. The outer periphery of the tire is thus kept in a more perfect circle.

In addition, when the second member 6 or 24 is pulled radially inwardly, its frictional pull on the adjoining resilient sections also acts radially inwardly. The inward movement tends to force the sections together on converging radii and such convergence rapidly increases the compression of the sections together on their sides and inner edges. This is much more effective in resisting displacement of the sections than in the case when a unitary wedge-shaped block is withdrawn radially outwardly and friction against it tends to pull the adjoining resilient sections radially outwardly on diverging radii, during which movement the compression of the sections together decreases.

This invention minimizes distortion of the portions of the resilient sections which are adjacent to the joined ends of the internal band iron. This is due to the fact that the parts of the resilient sections which are radially outside of the slots through which the band iron passes are thicker, longer and thus much stronger than are the parts which are radially inside of the slots. Accordingly, when the parts which are outward of the slots are pulled against the band iron, being much stronger, they resist distortion caused by being forced against the band iron much better than do the parts which are inward of the slots.

In the form of the invention illustrated in FIGS. 13 through 16, since the first member 22 is removed after the tire is permanently assembled in its compressed condition and before the second member 24 is withdrawn, the hinged plate 28 is collapsed against the plate 27, allowing the radially outward ends of the member 24 to abut with a total thickness of only the combined thicknesses of the two plates 27 and 28. This reduces the thickness of the second member throughout much of its length, tapering it into a wedge shape and thus reducing the friction between the second member and the adjoining resilient sections to a minimum before the second member is withdrawn. The frictional pull between the second member and the adjoining resilient sections diminishes while the tapered, collapsed, second member 24 is being withdrawn. The thickness of the collapsed second member is appreciably less than the thickness of a unitary, wedge-shaped section.

This invention also permits a greater pressure to be exerted on the tire when assembling it because the removable section members, when put together, form a rectangle with only a small opening 21 in the center for the band iron to slide through. The sides of the opening 21 enclose the band iron on its radially inner side, as well as on its edges and outer side, thereby preventing heavy compression of the tire from forcing rubber and fabric of the adjoining resilient sections into the securing opening. By contrast, a unitary, wedge-shaped, section has a slot which must be open all the way to the thinner end of the wedge and must be wide enough throughout its length to span the width of the band iron. In use of such a unitary section, rubber and fabric of the adjoining resilient sections are forced into the long slot, partially closing the slot and leaving little space, which makes it difficult to assemble the tire. Because rubber and fabric are forced into the slot of a unitary section, the compressing force which is exerted upon the tire must be limited to leave enough space for insertion of the band aligning jig, tapered pin, bolt and box end wrench with nut, as described above. A removable section made in accordance with this invention holds the rubber and fabric out of the opening in the removable section even when the tire is subjected to great pressure, permitting free access for assembling the tire and providing more space for welding the ends of the internal band iron together. As a result, a weld can be readily made which extends over a greater area of the band and is stronger. Since a considerably greater compression is possible with use of this invention, a tire can be made which is more nearly a solid tire and has greater load carrying capacity and longer life.

In the manufacture of such a tire, after the ends of the band iron are bolted together, they are welded together on and near their edges accessible through one opening of the removable section, e.g., the lateral opening 11. The tire is then released from compression on the work table and is turned over onto its other side, on which the other edges of the band iron ends are accessible for welding through the other opening 17, after the tire is again compressed. During such inverting of the tire, a unitary removable section sometimes flies out of the tire with tremendous force, endangering the lives of nearby personnel. A removable section made in accordance with this invention does not present such a hazard. The inner member 6 or 24 can not fly radially outwardly because it is stopped by the band iron. The outer member 5 or 22 also can not fly outwardly because, when assembled with the inner member, it has no free end edge against which the rubber and fabric can push; the core 8 or 8A is enclosed within the cavity 14 or 14A and the lower side with its recesses 7 or 23 receives the core 15 or plates 27 and 28 of the inner member.

Another disadvantage of a unitary removable section is that much greater pulling force is required to remove it from the tire than is required for a section made in accordance with this invention, because all of the friction of the resilient sections is concentrated on the one unitary removable section. Conversely, the surface area, abutting against the resilient sections, of one member of a removable section made in accordance with this invention is less than half the surface area of a unitary section. The friction of one member against the adjoining resilient sections is thus less than half that of a unitary section.

In the case of the form of the invention embodying a hinged plate, illustrated in FIGS. 13–16, the members have even less friction against the resilient sections. The recesses 23 of the outer member 22 do not bear against the resilient sections and have little friction against the inner surfaces of the plates 27 and 28. The remaining area of the outer member 22 which is in contact with the resilient sections and the consequent friction are relatively small. Also, after the outer member 22 has been pulled out and the hinged plate 28 is collapsed against the plate 27, the two plates have virtually no friction against the resilient sections and there is comparatively little area on the inner member 24 remaining in contact with the resilient sections.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A removable section, for use in the manufacture of tires composed of radially extending resilient sections held under compression in the shape of a toroid by an internal band iron, comprising a first member having at least one recessed portion and a plunger portion and a second member having a recessed portion and a plunger portion, the plunger portion of the first member being adapted to be fitted within the recessed portion of the second member and the plunger portion of the second member being adapted to be fitted within the recessed portion of the first member.

2. The invention according to claim 1 in which the plunger portions are spaced from each other in assembled position.

3. The invention according to claim 1 in which each member has an apertured portion adjacent to its plunger portion, the apertured portions being in alignment with each other.

4. The invention according to claim 1 in which each member has an apertured portion adjacent to its recessed portion, the apertured portions being in alignment with each other.

5. The invention according to claim 1 in which each member has an apertured portion adjacent to its plunger portion and another apertured portion adjacent to its recessed portion.

6. The invention according to claim 1 in which the plunger portion of the second member comprises a first plate hinged to said member and a second plate integral with said member and extending in the same direction as the first plate.

7. The invention according to claim 6 in which the recessed portion of the first member comprises a pair of grooves for receiving the ends of the plates and holding them in spaced relationship.

References Cited in the file of this patent
UNITED STATES PATENTS

| | | |
|---|---|---|
| 2,588,810 | Dietrich | Mar. 11, 1952 |
| 2,743,693 | Schaper | May 1, 1956 |